(12) United States Patent
Trossen et al.

(10) Patent No.: US 11,765,255 B2
(45) Date of Patent: Sep. 19, 2023

(54) TRANSPORT PROTOCOL FOR COMMUNICATION BETWEEN EDGE TERMINATION POINTS

(71) Applicant: InterDigital Patent Holdings, Inc., Wilmington, DE (US)

(72) Inventors: Dirk Trossen, London (GB); Sebastian Robitzsch, London (GB); Scott C Hergenhan, Collegeville, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 53 days.

(21) Appl. No.: 16/651,493

(22) PCT Filed: Sep. 24, 2018

(86) PCT No.: PCT/US2018/052371
§ 371 (c)(1),
(2) Date: Mar. 27, 2020

(87) PCT Pub. No.: WO2019/067343
PCT Pub. Date: Apr. 4, 2019

(65) Prior Publication Data
US 2020/0267243 A1     Aug. 20, 2020

Related U.S. Application Data

(60) Provisional application No. 62/565,530, filed on Sep. 29, 2017.

(51) Int. Cl.
*H04L 69/168*     (2022.01)
*H04L 47/10*     (2022.01)
*H04L 47/193*     (2022.01)

(52) U.S. Cl.
CPC ............ *H04L 69/168* (2013.01); *H04L 47/18* (2013.01); *H04L 47/193* (2013.01)

(58) Field of Classification Search
CPC ..... H04L 69/168; H04L 47/18; H04L 47/193; H04L 12/4633; H04L 47/41
See application file for complete search history.

(56) References Cited

U.S. PATENT DOCUMENTS

2015/0138983 A1   5/2015   Williams et al.
2017/0034055 A1*   2/2017   Ravindran ............ H04L 45/306
(Continued)

FOREIGN PATENT DOCUMENTS

EP          1267529 A2    12/2002
WO    2013/085977 A1    6/2013
(Continued)

OTHER PUBLICATIONS

Named Data Networking, "Publications of Named data networking", Available at <http://named-data.net/publications/>, 2014, 14 pages.
(Continued)

*Primary Examiner* — Jung H Park
(74) *Attorney, Agent, or Firm* — CONDO ROCCIA KOPTIW LLP

(57) ABSTRACT

An edge termination point (ETP) transport protocol between two or more ETPs in a network, such as a Layer 2 transport network, may be provided. A device may receive an incoming internet protocol (IP) transaction at an edge termination point (ETP) in a network. The device may terminate the received incoming IP transaction at the ETP. The device may map the terminated incoming IP transaction onto an ETP-to-ETP communication. The device may control the ETP-to-ETP communication. For example, the device may control the ETP-to-ETP communication based on a resource management regime. The device may map the ETP-to-ETP communication onto one or more outgoing IP transactions at the ETP. The device may map the IP transaction onto an ETP-ETP communication. The ETP-ETP communication (Continued)

may include one or more ETP flows and one or more ETP transactions.

18 Claims, 10 Drawing Sheets

(56) References Cited

U.S. PATENT DOCUMENTS

| | | | |
|---|---|---|---|
| 2017/0237660 A1* | 8/2017 | Trossen | H04L 45/748 370/392 |
| 2018/0007116 A1 | 1/2018 | Trossen | |
| 2018/0007176 A1* | 1/2018 | Suthar | H04L 69/04 |
| 2020/0076764 A1 | 3/2020 | Robitzsch et al. | |
| 2020/0344084 A1* | 10/2020 | Shribman | H04L 61/5007 |
| 2021/0211518 A1* | 7/2021 | Shribman | H04L 63/029 |

FOREIGN PATENT DOCUMENTS

| | | |
|---|---|---|
| WO | 2016061243 A1 | 4/2016 |
| WO | 2018009657 A1 | 1/2018 |

OTHER PUBLICATIONS

"Pursuit Website", Available at <https://web.archive.org/web/20130906015320/http://www.fp7-pursuit.eu/PursuitWeb/>, 2013, 1 page.

IETF, "Bit Indexed Explicit Replication (BIER)", Available at <https://datatracker.ietf.org/wg/bier/about/>, 2017, 4 pages.

IETF, "Service Function Chaining (SFC)", Available <https://datatracker.ietf.org/wa/sfc/about/>, 2017, 3 pages.

Reed et al., "Stateless Multicast Switching in Software Defined Networks", IEEE International Conference on Communications (ICC), Kuala Lumpur, Malaysia, 2016, 7 pages.

Stadler et al., "Performance Enhancement for TCP/IP on a Satellite Channel", IEEE Military Communications Conference, Proceedings. MILCOM 98 (Cat. No.98CH36201), Boston, MA, USA, Oct. 19-21, 1998, pp. 270-276.

Trossen et al., "Designing and Realizing an Information-Centric Internet", IEEE Communications Magazine, vol. 50, No. 7, Jul. 2012, pp. 60-67.

* cited by examiner

US 11,765,255 B2

TRANSPORT PROTOCOL FOR COMMUNICATION BETWEEN EDGE TERMINATION POINTS

CROSS-REFERENCE TO RELATED APPLICATIONS

This application is the National Stage Entry under 35 U.S.C. § 371 of Patent Cooperation Treaty Application No. PCT/US2018/052371, filed Sep. 24, 2018, which claims the benefit of U.S. Provisional Application Ser. No. 62/565,530 filed Sep. 29, 2017, the contents of which are incorporated by reference herein.

BACKGROUND

Information-centric networking (ICN) may be a networking paradigm in which content may be exchanged by information addressing. One or more networked entities may be connected to the ICN that may be suitable to act as a source of information towards the one or more networked entities that requested the content.

SUMMARY

Systems, methods, and instrumentalities are disclosed for providing an edge termination point (ETP) in a network, such as a Layer 2 transport network. A device may receive an internet protocol (IP) transaction at an ETP in the network. For example, the device may receive an incoming IP transaction at the ETP. The device may terminate the received incoming IP transaction at the ETP. The device may map the terminated incoming IP transaction onto an ETP-to-ETP communication.

If two or more incoming IP transactions are mapped onto two or more ETP-to-ETP transactions (e.g., ETP-to-ETP communications), the device may perform an ad-hoc TCP flow control for the two or more ETP-to-ETP transactions. For example, the device may perform an ad-hoc TCP flow control for the two or more ETP-to-ETP transactions by determining a common denominator (e.g., least common denominator) for resources associated with two or more ETP-to-ETP transactions. Determining the common denominator (e.g., least common denominator) for resources associated with two or more incoming ETP-to-ETP transactions may include determining at least one of a maximum round-trip time (RTT) timer or a low (e.g., lowest) credit value.

The device may control the ETP-to-ETP communication. The ETP-to-ETP communication may be controlled based on a resource management regime. The ETP-to-ETP communication may be controlled based on ETP-to-ETP resource management regime. The ETP-to-ETP communication may be a Layer 2 communication (e.g., located in a Layer 2 transport network). The ETP-to-ETP communication may indicate a relationship (e.g., a long-term relationship) between two or more ETPs. The relationship (e.g., the long-term relationship) between two or more ETPs associated with the edge-to-edge communication may have an initial setup and may use the setup for one or more future transfers between the two EPTs. For example, the ETP-to-ETP communication may indicate a relationship between two or more ETPs that may be used for another transfer without further configuration.

The resource management regime that controls the ETP-to-ETP communication may include an ETP flow. The ETP flow may include one or more flow parameters. The one or more flow parameters may include a credit, a timer for round trip dependent mechanism, error rate information, and/or the like.

For a (e.g., each) ETP transaction from the ETP-to-ETP communication, the ETP transaction may include an error control information. For example, the error control information may include at least one of a sequence number, an outstanding packet, segment information, reassembly information, and/or the like.

The device may map the ETP-to-ETP communication onto one or more outgoing IP transactions at the ETP. The incoming transaction and/or the outgoing IP transaction may include an IP packet transfer, a TCP session, a hyper transfer protocol (HTTP) session, a stream control transmission protocol (SCTP) session, a user datagram protocol (UDP) packet transfer, an IP (e.g., a raw IP) datagram packet transfer, and/or the like.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
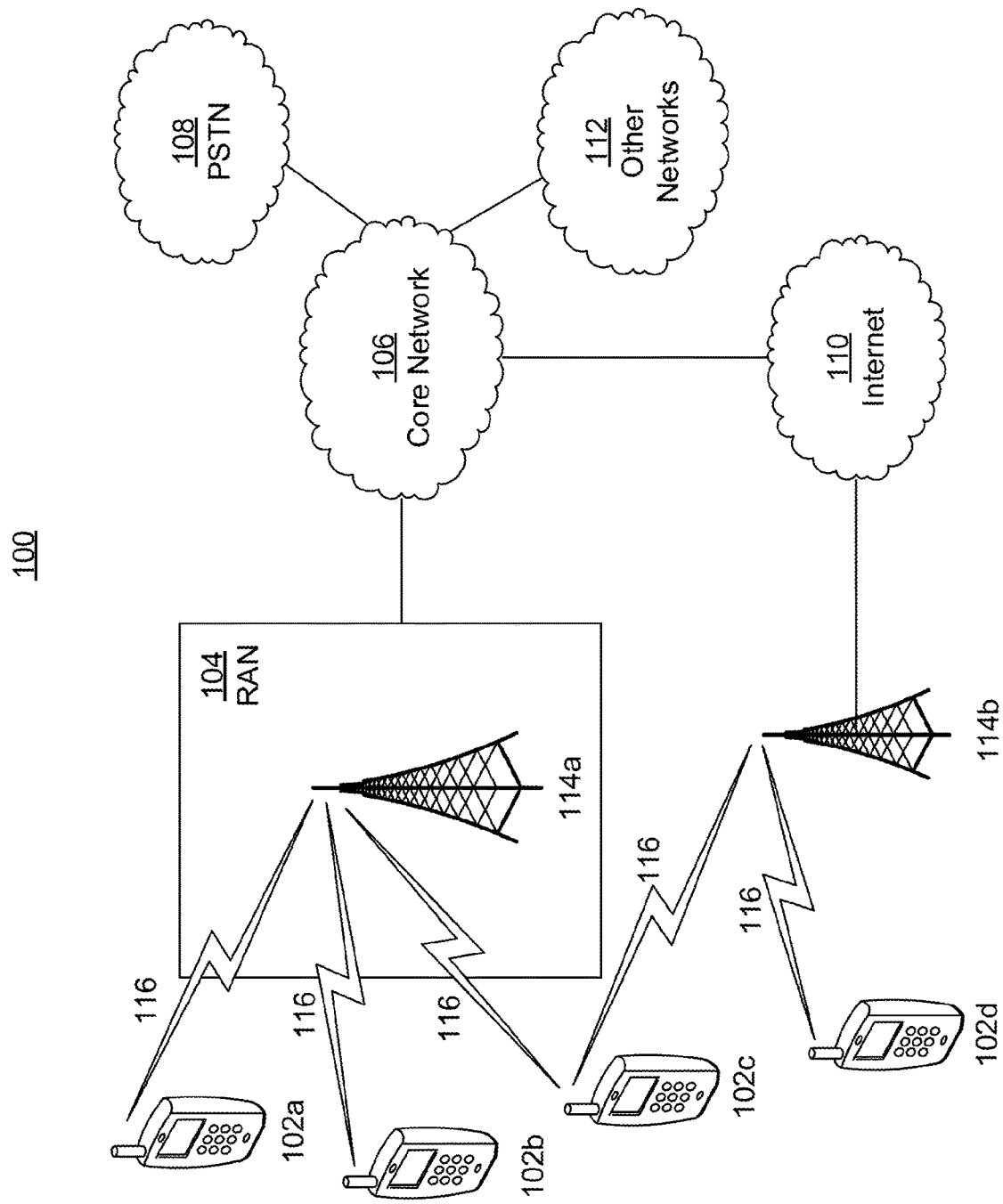
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
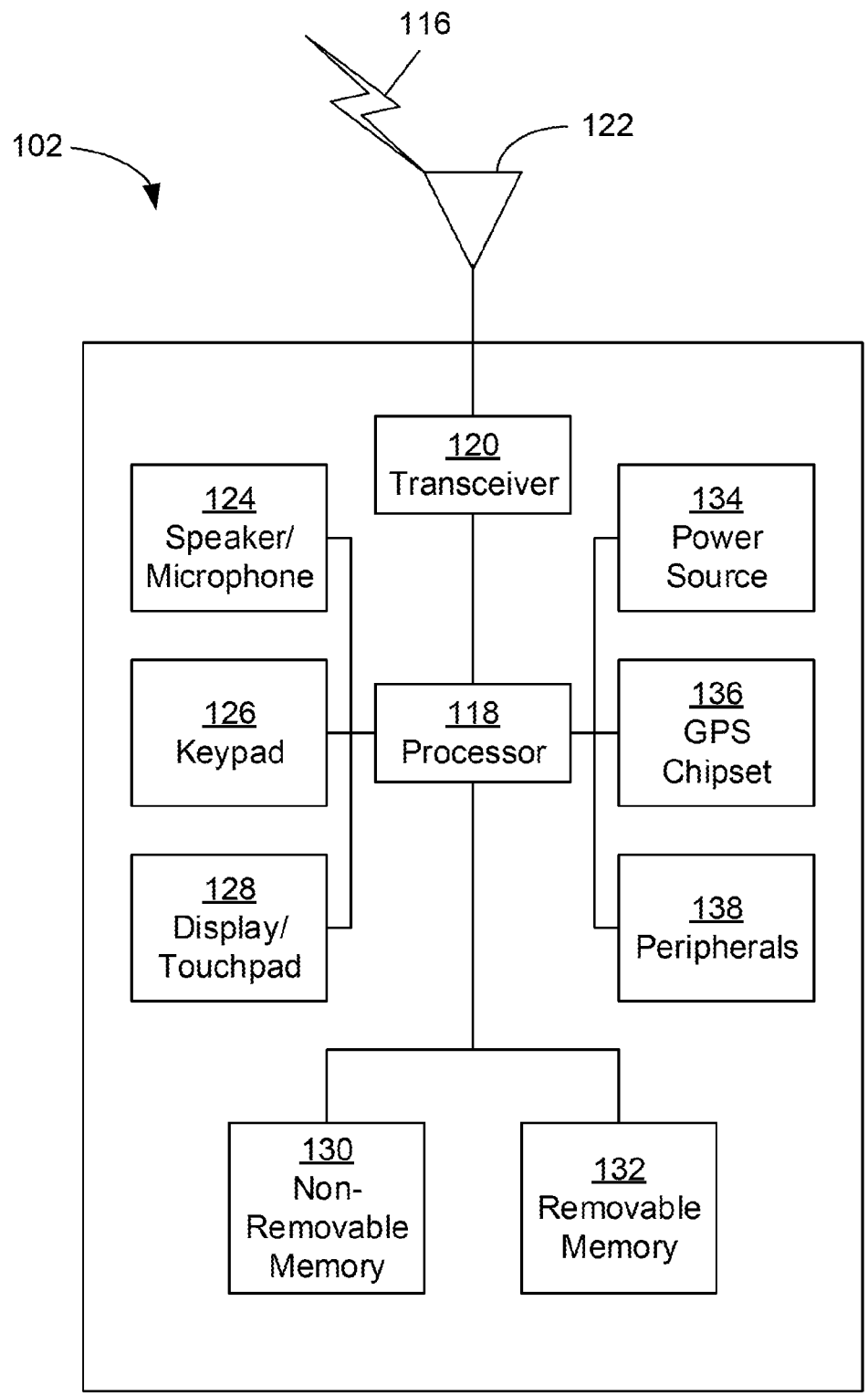
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset a Bluetooth module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
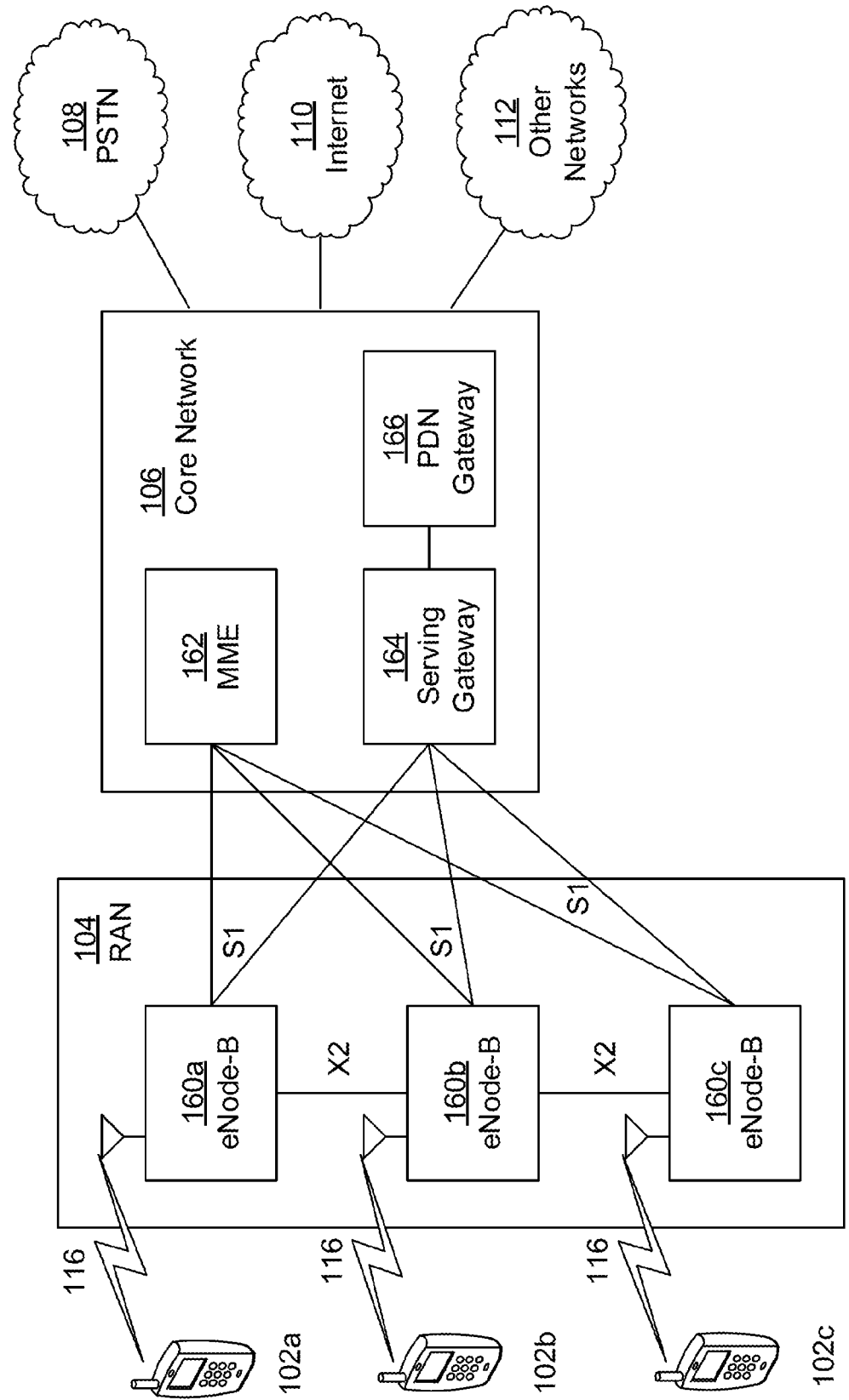
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
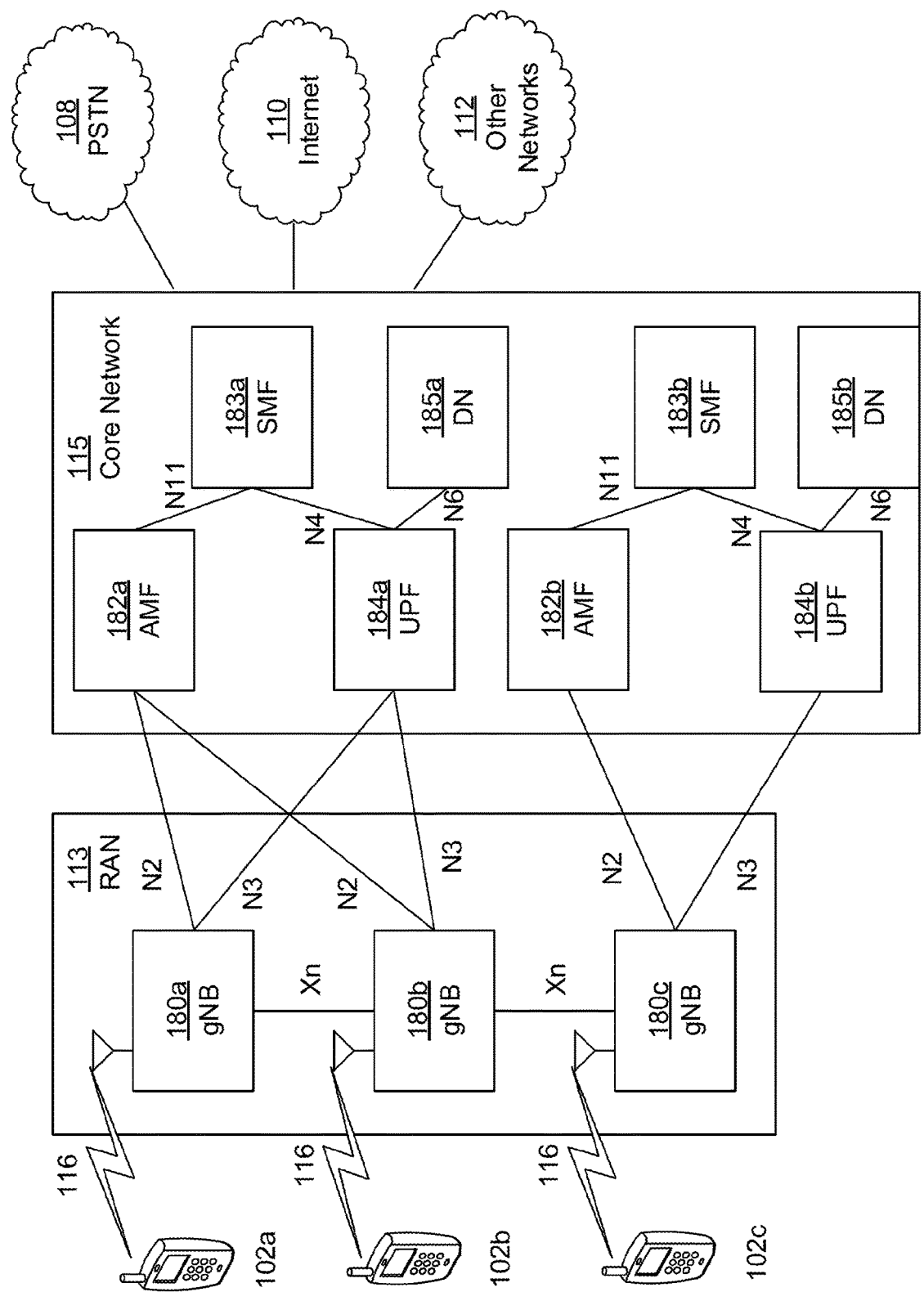
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a. 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b. 160c may serve as a mobility anchor for WTRUs 102a, 102b. 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Systems, methods, and instrumentalities are disclosed for providing an edge termination point (ETP) in a network, such as a Layer 2 transport network. A device may receive an internet protocol (IP) transaction at an ETP in the network. For example, the device may receive an incoming IP transaction at the ETP. The device may terminate the received incoming IP transaction at the ETP. The device may map the terminated incoming IP transaction onto an ETP-to-ETP communication.

If two or more incoming IP transactions are mapped onto two or more ETP-to-ETP transactions (e.g., ETP-to-ETP communications), the device may perform an ad-hoc TCP flow control for the two or more ETP-to-ETP transactions. For example, the device may perform an ad-hoc TCP flow control for the two or more ETP-to-ETP transactions by determining a common denominator (e.g., a least common denominator) for resources associated with two or more ETP-to-ETP transactions. Determining the common denominator (e.g., least common denominator) for resources associated with two or more incoming ETP-to-ETP transactions may include determining at least one of a maximum round-trip time (RTT) timer or a low (e.g., lowest) credit value.

The device may control the ETP-to-ETP communication. The ETP-to-ETP communication may be controlled based on a resource management regime. The ETP-to-ETP communication may be controlled based on ETP-to-ETP resource management regime. The ETP-to-ETP communication may be a Layer 2 communication (e.g., located in a layer 2 transport network). The ETP-to-ETP communication may indicate a relationship (e.g., a long-term relationship) between two or more ETPs. The relationship (e.g., long-term relationship) between two or more ETPs associated with the edge-to-edge communication may have an initial setup and may use the setup for one or more future transfers between the two EPTs. For example, the ETP-to-ETP communication may indicate a relationship between two or more ETPs that may be used for another transfer without further configuration.

The resource management regime that controls the ETP-to-ETP communication may include an ETP flow. The ETP flow may include one or more flow parameters. The one or more flow parameters may include a credit, a timer for round trip dependent mechanism, error rate information, and/or the like.

For a (e.g., each) ETP transaction from the ETP-to-ETP communication, the ETP transaction may include an error control information. For example, the error control information may include a sequence number, an outstanding packet, segment information, reassembly information, and/or the like.

The device may map the ETP-to-ETP communication onto one or more outgoing IP transactions at the ETP. The incoming transaction and/or the outgoing IP transaction may include an IP packet transfer, a TCP session, a hyper transfer protocol (HTTP) session, a stream control transmission protocol (SCTP) session, a user datagram protocol (UDP) packet transfer, a raw IP datagram packet transfer, and/or the like.

Architectures associated with information-centric networking (ICN) may be used to replace (e.g., replace or partially replace) current network infrastructure to realize desired network-level functions. For example, an architecture associated with ICN may overlay an existing architecture, such as an IP-based architecture, a local Ethernet-based architecture, and/or the like. The migration scenario described herein may transition one or more user equipment (UEs), such as WTRUs, to an ICN-based network. With IP-based applications providing a broad range of Internet services, transitioning one or more of the IP-based applications may be a hard task. For example, transitioning one or more of the IP-based applications may be a harder task than a transition of a network-level functionality, such as protocol stack implementation, in the WTRU since a transition of a server-side component, such as e-shopping web-servers and/or the like, may be needed. One or more IP-based services and/or IP-based WTRUs may continue to exist.

The transition to ICN at the network level may provide increased efficiency by one or more of the following: through the usage of in-network caches and/or the spatial/temporal decoupling of sender/receiver; the utilization of software-defined network (SDN) upgrades, which may be ongoing, for flow management; and/or the like.

A HTTP-level service may be provided over an ICN network. In examples, one or more HTTP-level services may be provided over an ICN network by mapping HTTP request and/or response into one or more appropriate ICN packets and/or publishing towards appropriate ICN names. HTTP services may present a mapping on ICN. In examples, HTTP services may deliver a HTTP-level response to more than one requestors in a case where one or more quasi-synchronous requests arriving at a server side.

An IP/HTTP mapping may be applied onto an ICN-based exchange and may not provide insights or examples for a reliable and/or flow controlled transfer of individual publications in a network. The mapping may rely on any reliability provided by the ICN that the mapping is based on.

Resource management may be described herein. If a reliable transfer for a publication for one or more HTTP-level services are provided over an ICN network as part of an underlying ICN system, resource fairness may become an issue. The resource fairness may be linked to transmission control protocol (TCP) friendliness, such that a flow(s) or control(s) may compete fairly with a TCP flow on media timescales. Competing fairly may refer to a flow receiving 1/n of the available bandwidth at a joint bottleneck with n flows, such as TCP flows, being present. The resource fairness, such as a share of received bandwidth, may be linked with a behavior of a specific flow control mechanism, namely that of TCP. TCP friendliness may be a behavior of a non-TCP communication flow to fairly share a network resource(s) in a bottleneck scenario among one or more (e.g., all) transport connections flowing over the bottleneck scenario.

A transport protocol for an underlying ICN may be TCP friendly. For example, a transport protocol for an underlying ICN may be TCP friendly because an encapsulation of an IP packet and/or complement of a mapping on ICN for HTTP may request that any transport protocol for an underlying ICN may be assumed to be TCP friendly. The ICN capabilities may be utilized for the underlying transport. If the ICN capabilities are utilized for the underlying transport, the ICN capabilities may not satisfy a TCP friendliness requirement(s). For example, a parallel IP-based stream, such as a parallel file transfer protocol (FTP) session, may receive less resources than that of a session without the IP/HTTP-over-ICN system if the ICN capabilities are utilized. In a scenario with parallel HTTP-over-ICN and/or Bittorent, such as TCP-over-IP-over-ICN sessions, utilizing ICN capabilities for the HTTP sessions, while realizing the Bittorrent sessions over the underlying TCP flow control, may lead to the Bittorrent throughput starving. For example, the Bittorrent may converge to zero throughput, due to the aggressive nature of a network coding flow control being used for the HTTP-over-ICN session.

A link may be formed between fairness and a specific behavior of a flow control mechanism, namely that of TCP. The fairness may be referred to receiving 1/n-th of the available bandwidth. The fairness may be defined to create fairness between physical endpoints, such as with n endpoints connected to a network. An endpoint may be configured to receive 1/n-th of the bandwidth. The endpoints may have increased capabilities of physical endpoints. The notion of endpoints may become flexible. For example, when establishing hundreds of parallel TCP flows at a physical endpoint, a TCP may receive its fair share of bandwidths. Against a TCP flow from another physical endpoint, the TCP flow may result in the first physical endpoint receiving a higher share (e.g., significantly higher share) of the bottleneck bandwidth. File sharing software may utilize this behavior, and the file sharing software may be traffic managed by a network operator. For example, a network operator may manage the file sharing software's traffic and its fair share may be artificially decreased. HTTP traffic may rely on a TCP-based transfer of request(s) and may result in one or more small TCP flows. The TCP friendliness may be applied over medium timescales. A web application, such as a file sharing software, may not receive its fair share of resources against long-running flows as the physical endpoint may not receive its fair share of resources. Transport requirements may vary. For example, TCP friendliness may be defined for unicast flows with a number of fairness issues in the presence of multicast traffic. The transport requirements may vary, and linking the resource fairness against the behavior of a specific flow control may be seen limiting.

A resource management may be provided for a transport network, such as an ICN. A resource management may be independent from the TCP resource management behavior used by one or more IP applications (e.g., most IP applications) at the level of the devices connected to the transport network. A resource management may be configured to ensure overall resource fairness across one or more flows of the network.

A mapping(s) may be provided for IP and/or HTTP-over-ICN. The mapping(s) may be applied to one or more other systems located at the edge of the network, which may encounter a similar resource management scenario(s) as described herein. For example, a mapping may be Service Function Chaining (SFC). The SFC may be one or more functions being realized over an overlay transport network.

A transport protocol may be provided for communication in a system utilized by one or more of the following: HTTP-level services over an ICN network, a specific HTTP mapping described herein, e.g., for SFC, and/or the like. A mapping of IP-based protocol described herein may interact with a transport protocol. The mapping may implement resource fairness, and the mapping may be independent from the IP-transport level realized on top of a transport network.

Edge Termination Points (ETP) may terminate one or more IP-level relationships and may translate the IP-level relationships into relationships between the ETPs. The communication between two ETPs may be configured through a flow-based relationship. For example, suitable ETP node identification (e.g., for a flow-based relationship for the ETP-ETP communication) may be used to establish a long-term flow relationship between two or more ETPs, such as ETP-ETP communications. In examples, a Layer 2 (L2) transport network may be configured to realize a communication between the ETPs. Ethernet-based Software-defined Networking (SDN) and/or forwarding rules may be utilized for the Layer 2 transport network. In examples, the transport between the ETPs may be IP-based and may be an overlay one. Bit indexed explicit replication (BIER) and/or SFC within Internet engineering task force (IETF) may provide a suitable communication platform between ETPs.

An ETP may communicate with at least one communication element, such as an L2 switch, in a network between ETPs. The ETP may communicate through a suitable IP-level interface to an IP application. If a transport between the ETPs is IP-based, the ETP may be realized in one or more of the followings: a network attachment point (NAP); and/or within a WTRU as part of a revised protocol stack, such as a convergence layer for dual-stack IP/ICN WTRU.

Figure 2:
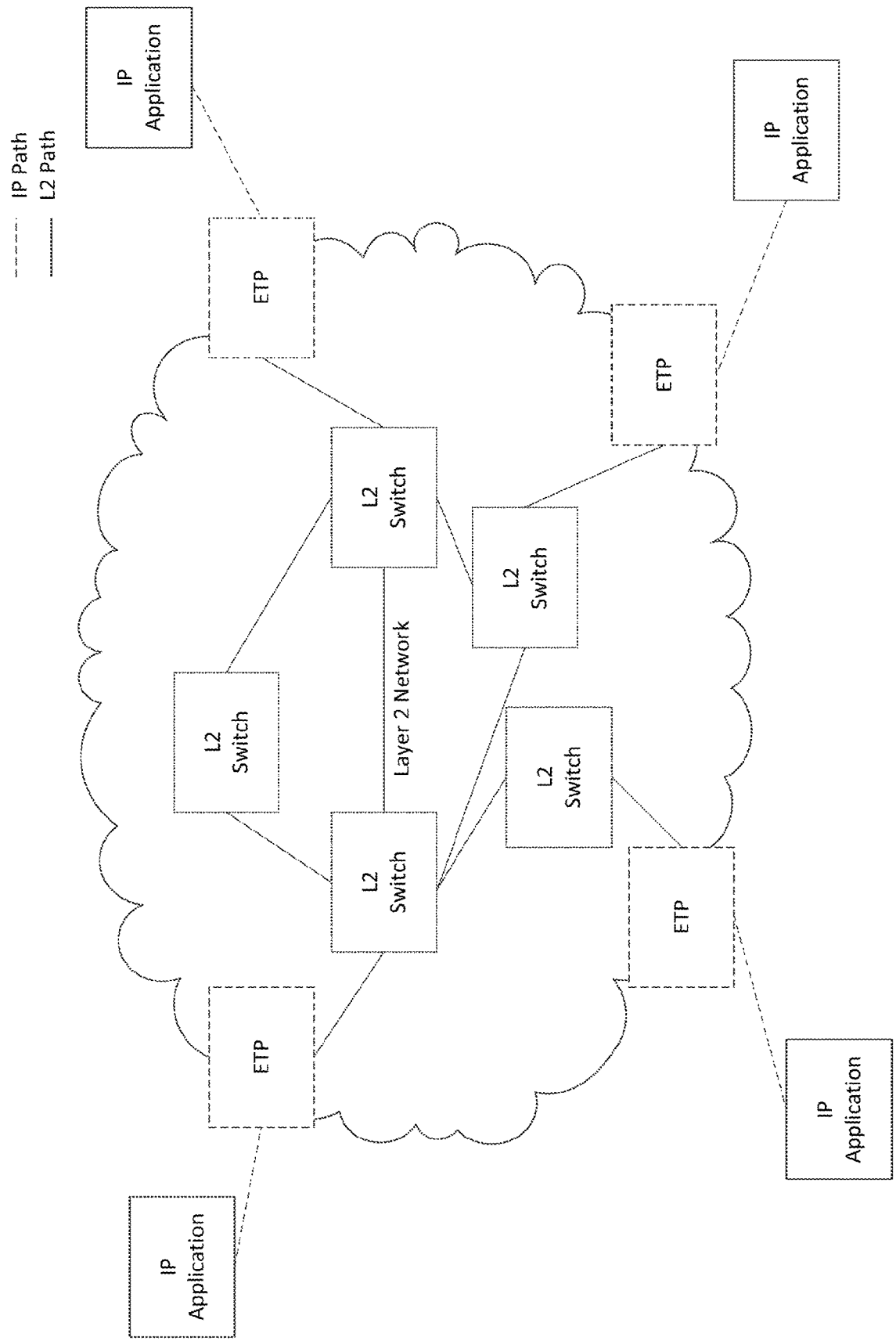
FIG. 2 illustrates an example edge termination points (ETPs) in a Layer 2 transport network.

FIG. 2 illustrates an example system of ETPs connected via an SDN-based Layer 2 network. The dotted lines shown in FIG. 2 may show a local IP path, and the solid lines shown in FIG. 2 may outline the Layer 2 flow throughout the network.

Figure 3:
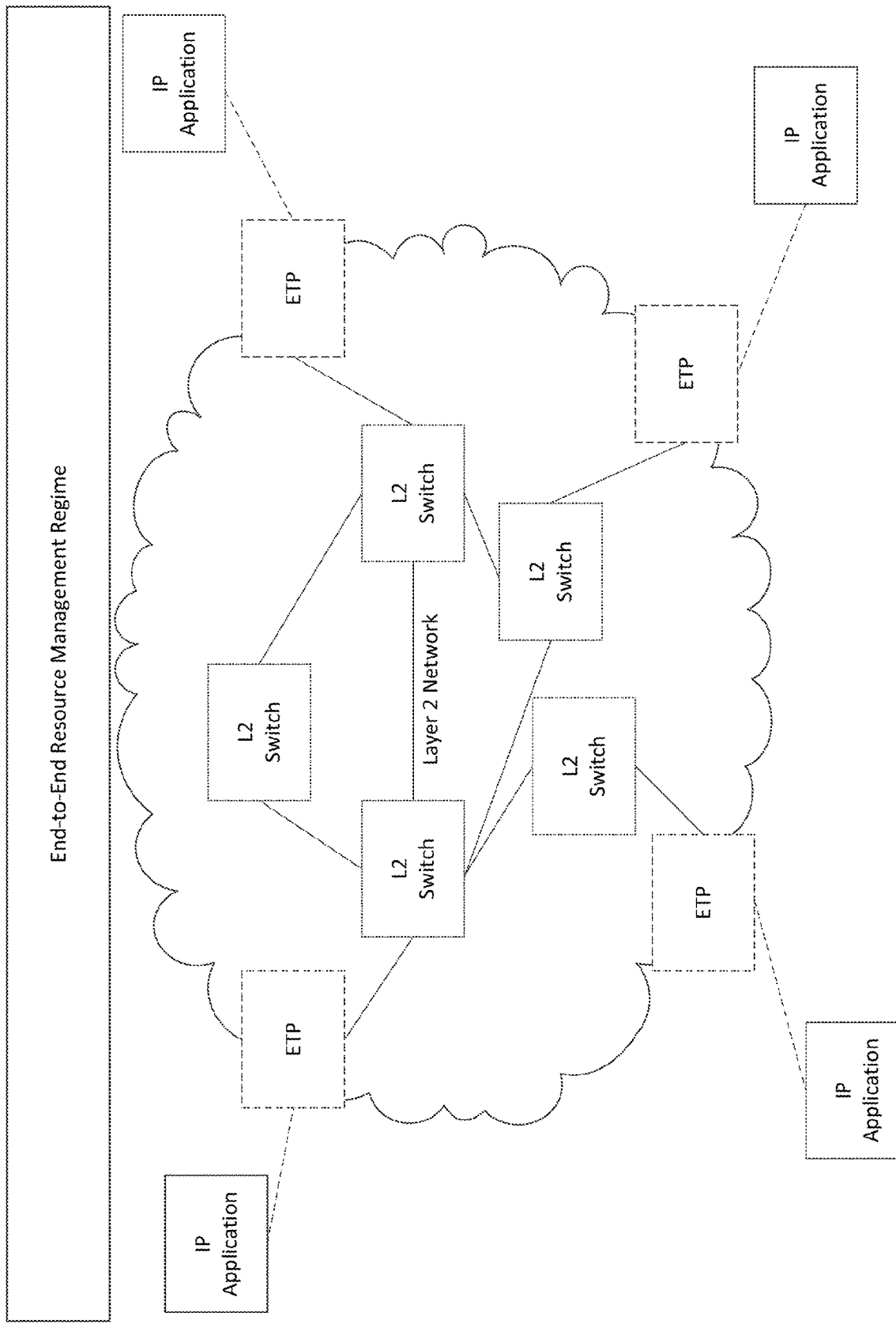
FIG. 3 illustrates an example end-to-end resource management regime.

Resource management regimes may be separated. Resource management regime may be established in an end-to-end relationship between two or more IP applications, as shown in FIG. 2. A protocol(s), such as TCP, may provide an end-to-end relationship. For example, a protocol(s) may provide an end-to-end relationship by representing an individual relation as a flow. A flow may be managed. For example, the flow may be managed according to a flow control mechanism(s) developed for TCP. Individual flows may exist between same IP endpoints or between other endpoints in the network. Individual flows may be deemed fair if the individual flows follow the asymptotic medium-term behavior of a set of n TCP flows. For example, the individual flows may receive 1/n of the available resource, such as bandwidth, from an end-to-end perspective. Due to the relation to TCP, a transport protocol(s), such as end-to-end transport protocol, may be referred to as TCP friendly, if the transport protocol exhibits such behavior over time. Friendliness protocol may be configured to preserve any parallel existing TCP flow by consuming more than its fair share of 1/n. From a system perspective, the TCP flow control mechanism(s) and/or TCP-friendly transport protocol(s) may establish a resource management regime. The established resource management regime may be governed by the TCP friendliness, which may be shown in FIG. 3. FIG. 3 illustrates an example end-to-end resource management regime. The resource management configuration may be implemented end-to-end, such as within the IP-based endpoints that may host the IP application, as shown in FIG. 3.

TCP-friendliness may be implemented as a principle for end-to-end system. If TCP-friendliness is implemented as a principle for end-to-end system, a system configured for FIG. 2, such as providing HTTP-level services over an ICN network and/or a specific mapping on ICN, may exhibit the same behavior by having a fair share.

Figure 4:
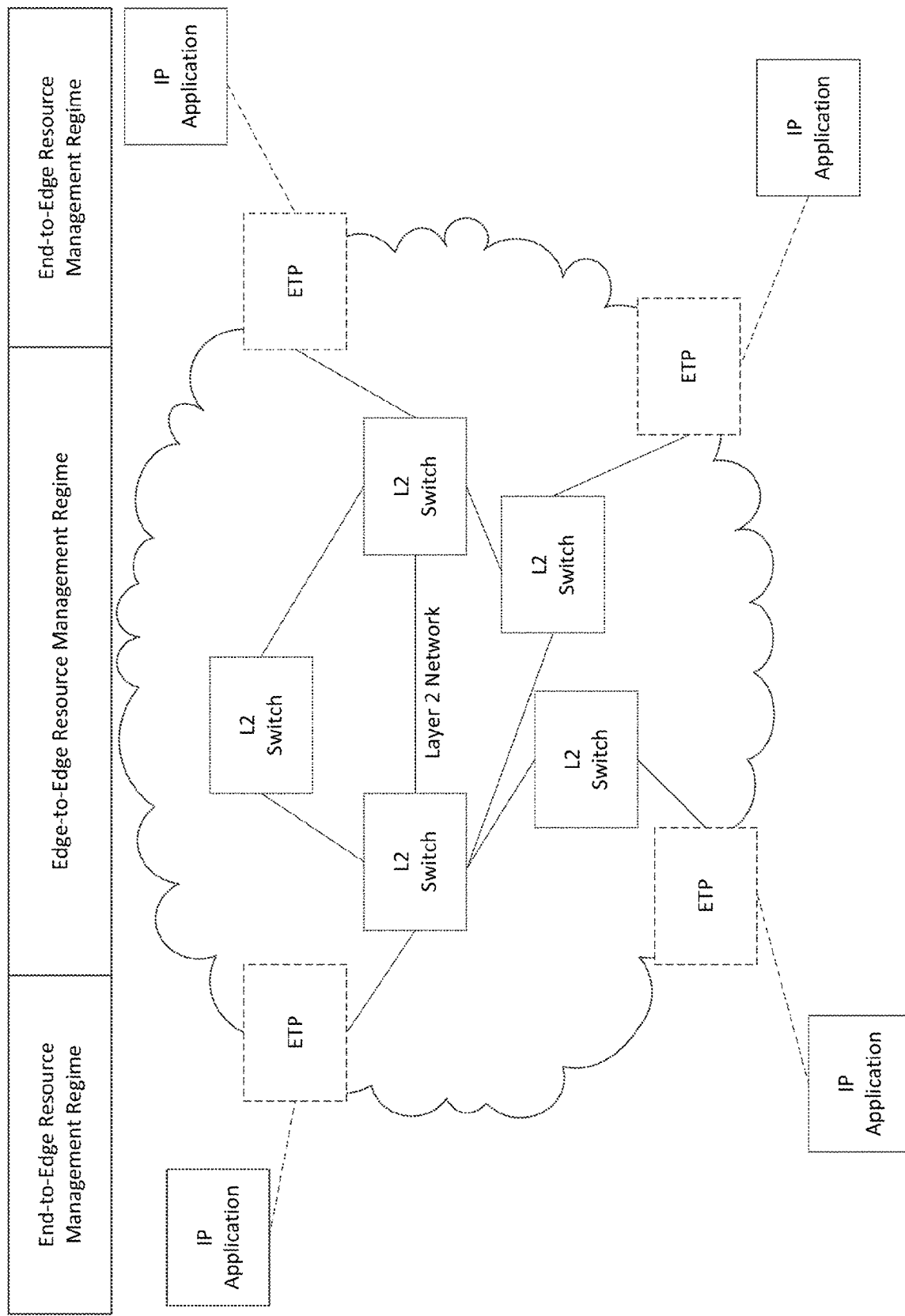
FIG. 4 illustrates an example of dividing up the resource management regime.

FIG. 4 illustrates an example of dividing up a resource management regime. The resource management configuration shown in FIG. 3 (e.g., end-to-end resource management regime) may be split into two or more distinct areas. For example, the resource management regime may be split into three distinct areas, such as two end-to-edge regimes and an edge-to-edge regime. The ETPs may terminate a transport protocol(s). For example, the ETPs may terminate a transport protocol(s) originally destined to an IP application residing at another ETP. A relationship between a local IP application and terminating ETP on either end of a network may be an end-to-end regime. The protocols developed for end-to-end Internet-based communication may ensure that the end-to-edge regimes from an IP application(s) to an ETP(s) remain TCP-friendly.

From an originating ETP to another ETP, an edge-to-edge regime may be configured. The other ETP, which may differ from the originating ETP, may communicate with a terminating IP application. The terminating IP application, such as an outgoing IP application, may include an ETP towards an IP service endpoint, such as a server. In examples of edge-to-edge regime described herein, a rule may be established that one or more communications, such as a flow(s), between any ETPs may not behave in a manner that one or more communications would violate the TCP friendliness criteria once combined with the end-to-edge regimes for any given end-to-end flow relation.

The established rule may not seem different from the TCP friendliness of the end-to-end resource management regime. The established rule, when applied to the exemplary system shown in FIG. 4, may separate the outcome of TCP friendliness, such as the fair share distribution of resources, from the behavior of the TCP flow control. For example, the resource management regimes, which may be governed by a TCP friendliness requirement, may be terminated at the edge of the network. For example, the resource management regimes may be terminated at the ETP of the network, as shown in FIG. 4. By terminating the resource management regimes, one or more other resource management regimes may be employed for edge-to-edge resources. One or more other resource edge-to-edge management regimes may maintain fair resource allocation. One or more other resource edge-to-edge management regimes may be applied to the ETP-to-ETP L2 network and may not be TCP friendly. Resource allocation maintained by other resource management may not be TCP friendly overall. Resource allocation maintained by other resource management may show better behavior associated with ramp-up of flow rate.

In examples, parallel HTTP and/or TCP based sessions (e.g., Bittorrent sessions) in a network may be provided. In examples, any session, which may be a HTTP session or a TCP based session, such as Bittorrent, may be realized via a centralized flow management configuration that statically allocates to an ETP-to-ETP relation 1/n-th of the bandwidth of the joint bottleneck of one or more flows. The system described herein may be considered fair in terms of fair share distribution among one or more flows. The system may be TCP-friendly. When stitching back together, the received resource allocations in three parts of the divided network (e.g., as shown in FIG. 4) may receive TCP flow associated with 1/n of the traffic. The received TCP flow of 1/n of the traffic may comply with the TCP friendliness requirement while no TCP flow may be penalized in its flow control behavior. The constant rate flow control may maximize the resource usage, e.g., based on the centralized knowledge of the traffic conditions.

If a TCP flow control mechanism is used in an end-to-end manner, such as exemplary system shown in FIG. 3, while utilizing an outlined a constant rate flow control system, such as utilizing the known 1/n-th assignment to the flow to parameterize a token bucket rate control, for HTTP sessions in a system, this constant rate flow control mechanism may penalize the Bittorrent TCP flows with the TCP-based flows degrading in throughput below their fair share.

By terminating the TCP flows at the edges, the behavior of the TCP flow control may no longer be visible in the ETP-to-ETP Layer 2 network, for example, since the common constant rate flow control may be used in the ETP-to-ETP regime (e.g., via the edge-to-edge resource management regime as shown in FIG. 4).

TCP performance enhancing proxies (PEPs), which may be in distributed mode, may split a connection and may run at the ETP, such as the exemplary system shown in FIG. 2. TCP PEPs may modify TCP parameters to the specifics of the edge-to-edge network, shown in FIG. 2, for example, to avoid degradation of performance. For example, a PEP configuration described herein may be used in a satellite environment(s) when the combination of fast access networks, which may be located at the edge, and long latency satellite edge-to-edge network may lead to degradations of the end-to-end performance. In such cases, PEPs may modify the TCP parameters in the edge-to-edge transmission. PEPs may be linked to the TCP flow control behavior. Through such linkage, PEPs may exhibit the same flow control behavior and may differ from the split of resource management regimes as shown in FIG. 4.

An IP transaction (such as IP transaction between IP applications and ETPs and/or End-to-Edge resource management regime as shown in FIG. 4) may be defined through a specific resource management configuration (e.g., resource management configuration of the IP application-to-ETP) that may be terminated at the incoming ETP. Such a transaction may be identified, via the specific resource management configuration, starting from a highest layer, such as layer 7, and may move downwards. In examples for one or more IP transactions, HTTP, TCP, stream control transmission protocol (SCTP), UDP, IP datagram (e.g., raw IP datagram), and/or the like may be identified. UDP and/or IP (e.g., raw IP) may use a resource management configuration (e.g., best effort resource management configuration), for example, without rate or error control. For example, the Edge-to-Edge resource management regime may classify one or more (e.g., all) protocols that are not TCP as best effort resource and may carry the one or more protocols over the L2 network without any rate or error control. HTTP may be seen as a TCP-based resource management configuration operating at the level of the individual HTTP requests/responses. TCP traffic, such as general TCP traffic, may be governed by the flow/error control applied to the entire TCP stream.

In examples, an HTTP session may be mapped onto an IP transaction. For example, an HTTP session may include an exchange of an HTTP request and response, an HTTP request and response including any possible fragmentation, and/or the like. A TCP based session that may not be an HTTP session may be mapped onto another IP transaction. For example, a TCP base session that may not be an HTTP session may include a transfer of a file in an FTP session and/or the like. Such mapping, as described herein, may be applied, for example, from the topmost layer to the lowest layer so that a transfer that may not be characterized as an IP transaction at the level of the IP layer may be interpreted as an individual IP transaction of IP packets. The IP transaction at the level of the IP layer interpreted as an individual IP transaction of IP packets may be maximum transmission unit (MTU)-size limited IP packets.

An IP Transaction at the ETP may be terminated. The IP transaction at the incoming and outgoing ETPs, shown in FIG. 2, may be terminated. For example, one or more IP transactions described herein, such as HTTP, TCP, IP/UDP datagram and/or the like, may be terminated.

For HTTP transaction, HTTP proxy-like termination may be implemented. Local TCP termination and extraction of the HTTP procedure may be included in the TCP stream to form an IP transaction.

For TCP transaction, TCP proxy termination may be implemented. For example, TCP proxy termination may be implemented with local TCP termination and/or extraction of the TCP stream bytes received at the ETP as part of the IP transaction.

For IP/UDP datagram transaction, packet capturing at the local interface towards the IP application may be implemented and/or the relevant IP or UDP datagram may be retrieved.

The same and/or similar IP transaction termination described herein may occur at the outgoing ETP where the IP application endpoint may be derived from the suitable identifier information that forms part of the IP transaction. The identifier information may encode the information on protocols and/or port information, which may allow for such termination at the outgoing ETP. For example, in the TCP/IP/UDP case, the IP destination address may be used while the fully qualified domain name (FQDN) of the URL may be used for HTTP.

Figure 5:
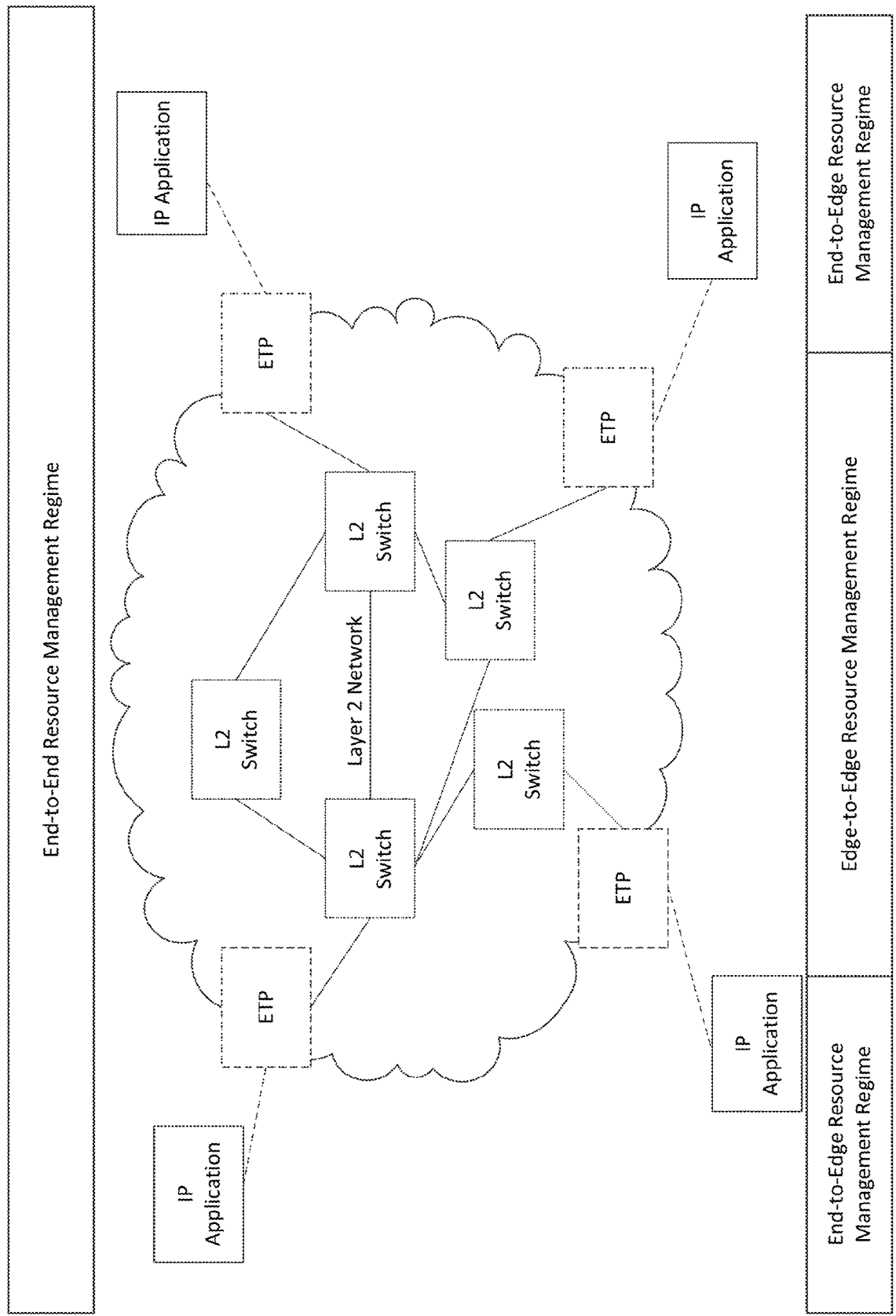
FIG. 5 illustrates an example regime having end-to-end resource management regime and dividing up the resource management regime.

In relation to FIG. 4, the termination at the ETP may establish the end-to-edge resource regime. FIG. 5 illustrates an example regime having end-to-end resource management regime (e.g., shown in FIG. 3) and divided up the resource management regime (e.g., shown in FIG. 4).

Figure 6:
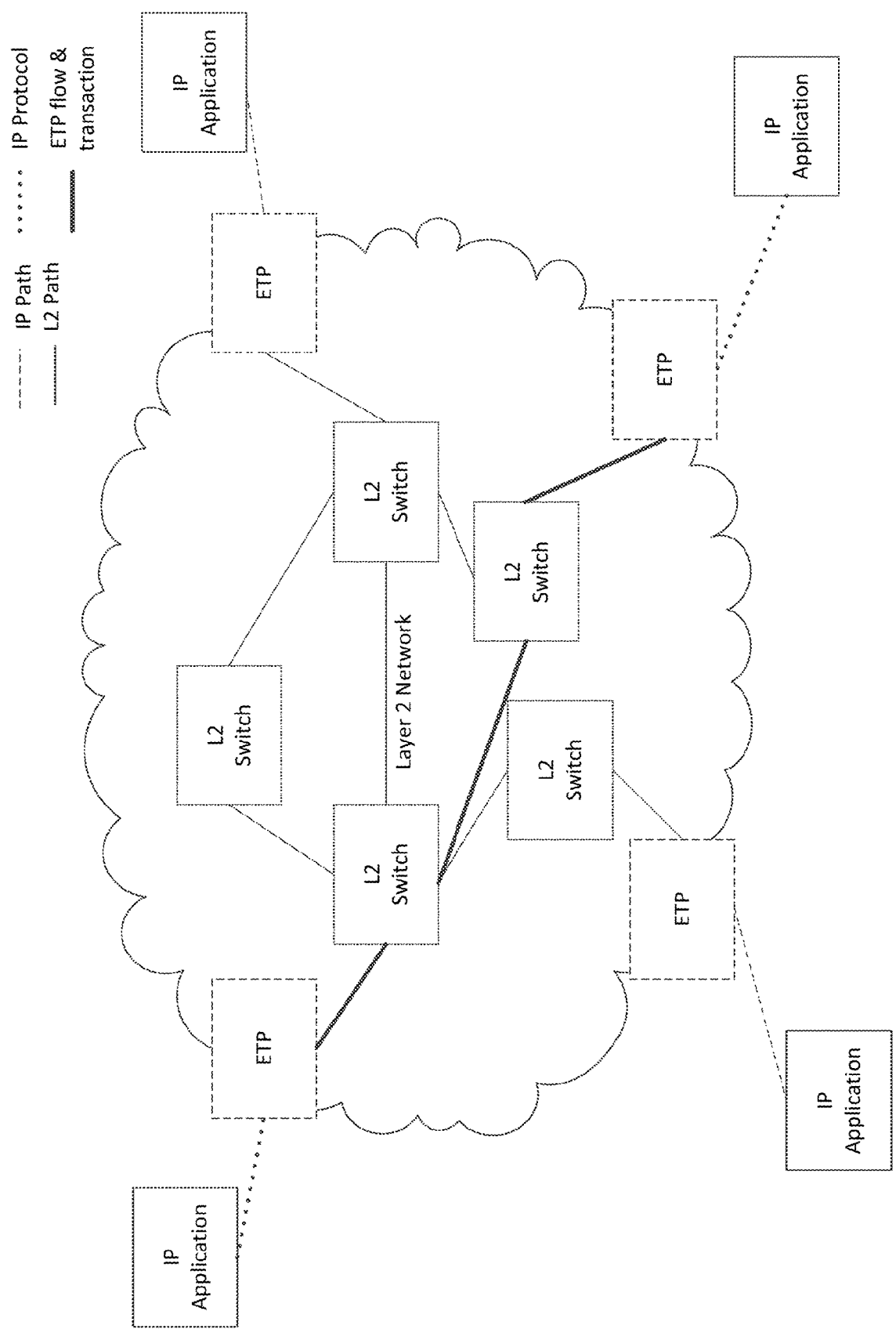
FIG. 6 illustrates an example edge termination points communication in a Layer 2 transport network.

One or more IP traffics may be mapped onto one or more ETP-ETP traffics. As described herein, one or more IP transactions may be terminated at the incoming ETP and/or outgoing ETP, which may be shown as thick dashed lines in FIG. 6. The one or more terminated IP transactions may be mapped onto an ETP-ETP interaction (e.g., referred to as ETP-ETP communication), as indicated in FIG. 6 with the thick solid line between two ETPs.

An ETP flow and/or an ETP transaction may be provided at a level of the ETP-to-ETP communication. An ETP flow (e.g., each ETP flow) may include one or more ETP transactions. The ETP flow may constitute a relationship between two ETPs. The relationship between two ETPs may be a long-term relationship. For example, a long-term relationship between two EPTs may setup initially and may be reused for one or more future transfers between the two ETPs with the edge-to-edge boundary (e.g., to avoid repetitive setup associated with TCP). A flow-specific flow and error control relationship may exist for an ETP flow. The flow-specific flow and error control relationship may govern the ETP transaction transferred through the ETP flow, which may maintain one or more flow parameters such as send credits, timers for round-trip time (RTT) dependent mechanisms, error rate information, and/or the like. The ETP flow between two ETPs may represent the edge-to-edge resource regime in FIG. 4.

An ETP flow may include one or more ETP transactions. An ETP transaction may have its own error control relationship and the error control relationship may retransmit lost and/or corrupted ETP transactions, if desired (e.g., or as needed). The error control relationship information may maintain information such as sequence numbers, outstanding packets, segmentation/reassembly information, and/or the like. For retransmissions triggered by one or more ETPs, the error control may rely on ETP flow-specific flow control information, such as timers, RTT information, and/or the like. One or more IP transactions may be mapped onto an ETP transaction. For example, one or more IP transactions may be mapped onto an ETP transaction and may have its own error control mechanism. Mapping from IP transactions onto an ETP transaction may have its own error control mechanism, the data originating from and destined to end-to-edge resource management regimes may be reliably transferred over the edge-to-edge network. An edge-to-edge resource management scheme may be establish. For example, one or more transactions may be combined under a resource management relationship, which may be represented by the combined flow control mechanism for a flow between the ETPs, to establish an edge-to-edge resource management scheme. Competition for resources within edge-to-edge may be governed by the established scheme (e.g., edge-to-edge resource management scheme) between ETP flows. Fair resource sharing among one or more transactions may be ensured. For example, fair resource sharing among one or more transactions may be ensured by mapping one or more transactions between ETPs into an ETP flow. The mapped one or more transactions between ETPs into an ETP flow may be governed by the combined flow control mechanism as described herein. Flow control may be configured to determine whether such fairness is TCP friendly or not. The requirement of TCP friendliness, which may request an overall TCP friendliness, may not imply to use TCP-based flow control system but merely imply that one or more TCP flows may not be disadvantaged over any other non-TCP like flow. Given that the flow control may be established edge-to-edge with a separate ETP flow, the ETP flow control mechanism may be configured to fulfil the equal bandwidth share requirement of TCP friendliness. The system described herein may use flow control of the edge-to-edge resource regime, such as for optimizing startup of flows.

Ad-hoc multicast relations may be implemented. Ad-hoc multicast relations may send a response(s) from an IP application to more than one other IP applications. Ad-hoc multicast relations may send a response(s) from an ETP to more than one ETP. In this case, the specific IP transaction, such as an HTTP response, may be mapped onto an ETP transaction and may be realized over more than one edge-to-edge, such as ETP flow. This may be referred to as an ad-hoc ETP flow.

Flow control for the ad-hoc ETP flow may utilize one or more parameters across one or more involved ETP flows. Utilizing one or more parameters across one or more involved ETP flows may result in a one-to-many relationship between the specific flow control for the ad-hoc ETP flow and the flow control(s) of the involved ETP flow(s). Such combined parameters may be the maximum RTT timer or a low (e.g., lowest) credit value, representing the common denominator (e.g., least common denominator) of the resources across two or more involved flows.

Figure 7:
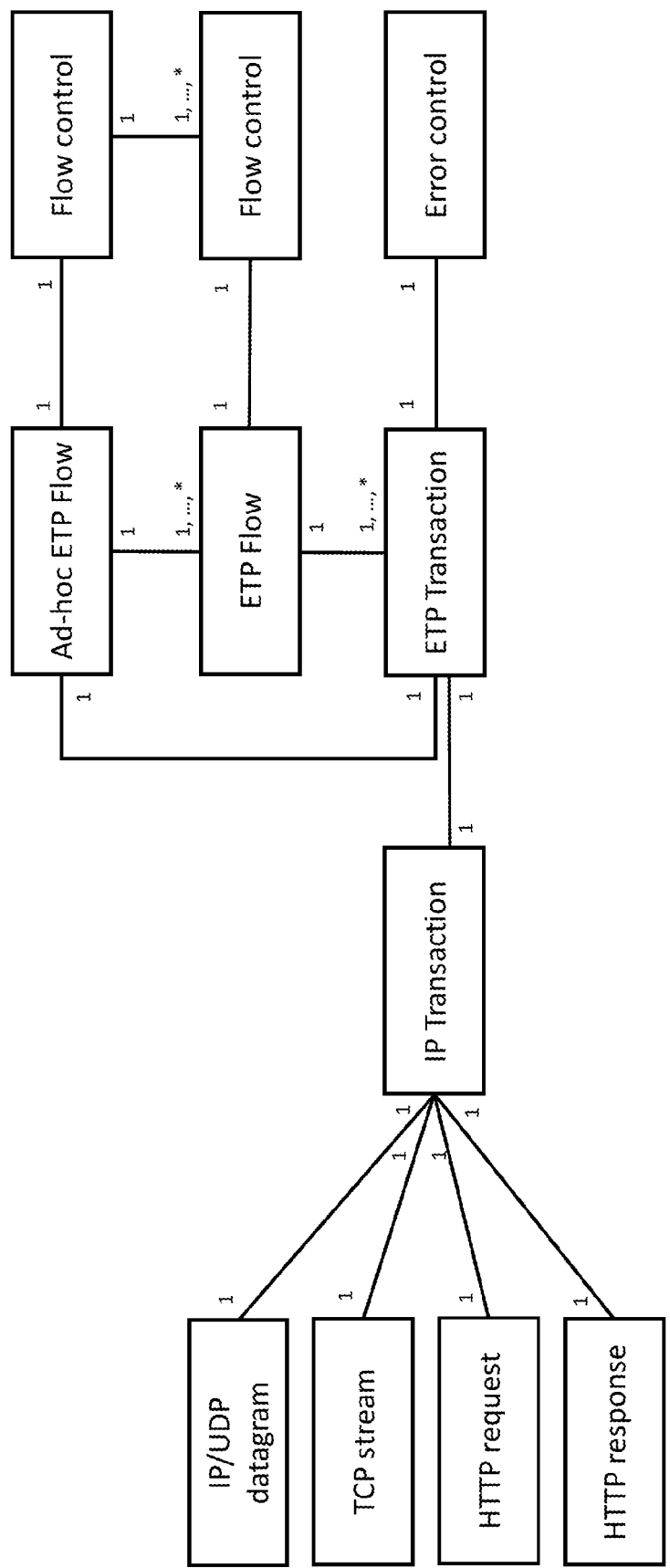
FIG. 7 illustrates an example mapping of an internet protocol (IP) transaction(s) onto an ETP flow(s) and/or an ETP transaction(s).

FIG. 7 illustrates an example mapping of an IP transaction(s) onto an ETP flow(s) and/or an ETP transaction(s). FIG. 7 may outline a relationship between the IP transactions and ETP flows/transactions with the relationships denoted as 1-to-1 or 1-to-many relationships. For example, 1-to-many relationships may utilize 1, . . . , * notations shown in FIG. 7. Such a relationship may be managed at an ETP, which may be an incoming and/or outgoing ETP.

The ETP transaction to ETP flow assignment from FIG. 7 may be configured to realize the flow control. For instance, an ETP may choose to separate one or more TCP-based ETP transactions from those based on HTTP. For example, an equal ETP flow share between a TCP flow(s) and a HTTP flow(s) may be ensured. In this case, two ETP flows may be established between two ETPs with an ETP flow maintaining the flow relation for TCP transactions, which may be IP-based transactions, while the separate ETP flow may handle the web transactions.

ETP flow may be established and/or terminated. An ETP flow may constitute a relationship, which may be a long-term relationship, between two ETPs. One or more setups may be configured for the relationship between two ETPs. In examples, an explicit setup may be used akin to that of TCP's three-way handshake. In examples, an implicit transaction-based flow establishment may be used where the sending of an initial transaction between two ETPs results in the creation of an ETP flow context between those two ETPs, which may be reused for any future transfer between those two ETPs, such as constituting an ETP flow.

Flow termination may be explicit. For example, flow termination may be explicit and may be based on a handshake protocol where an ETP, wishing to terminate the flow, signals this to the corresponding ETP. In examples, the ETP flow may be terminated or destroyed via timeout. For example, any internal ETP flow context information may be removed upon firing of an inactivity timeout. The explicit flow termination described herein may be combined with an implicit flow termination. A transaction-based flow establishment may make the notion of an ETP flow that of an internal, such as ETP flow context, data structure. The data structure may be created upon sending the first transaction to an ETP, which had previously not been contacted, while destroying the data structure upon the firing of the inactivity timeout.

Flow control may be chosen. As shown in FIG. 7, an ETP flow, which may be between an incoming and outgoing ETP, may be governed by a flow control mechanism. An appropriate flow control may be chosen to preserve the overall end-to-end TCP friendliness. TCP friendliness may implement (e.g., require) a fair share convergence and/or behavioral compliance, such as not penalizing a TCP flow(s). ETP flows, such as the separation of the regimes shown in FIG. 4, may define whether the flow control is TCP or non-TCP and may satisfy the TCP friendliness requirement for behavioral compliance. An appropriate flow control may be chosen to satisfy the TCP friendliness requirement for having a fair share convergence. The appropriate flow control may have a resource fair flow control. For example, the chosen flow control may converge to the fair share of resource usage in a system. The flow control mechanism may be the same for one or more ETP flows in any ETP-to-ETP combination and/or may likely be subject to standardization, as shown in mapping of FIG. 7. Flow control configuration may differ from ETP-to-ETP and for IP transactions with ETP flows, as described herein, as long as the overall fair share convergence is preserved. For example, flow control may not discriminate against another in its convergent behavior.

A protocol mapping may be utilized to receive IP/HTTP level messages that are being published over an ICN. The ETP, in this case, may map Network Access Point (NAP). The NAP may provide a standard IP network interface towards an IP-enabled device and may encapsulate any received HTTP request into an appropriate ICN packet, which may be published as an appropriately formed named information item. The NAP may subscribe to any appropriately formed named information items. The information identifier may represent any HTTP-exposed service that may be exposed at any IP-level device locally connected to the NAP. This may constitute an outgoing ETP shown in FIG. 2 for a return packet. The configuration described herein for the NAP may be applicable to a dual-stack WTRU.

Reliable transfer described herein may be provided when exchanging the published procedures by not relying on underlying ICN systems to provide such reliability. The IP/HTTP level termination described herein may apply to general reception of IP/HTTP messages and may allow to align the resource management, including the mapping on ETP flows/transactions.

Edge termination may be detected with the ETP-ETP flow management through inspection of the appropriate ETP-ETP packets. The joint management of transactions within an ETP flow may be detected through test flows that include a well-defined IP transaction pattern. The mapping of IP transactions to ETP transactions may be detected through generating different IP protocol transactions at the ETP side and may observe one or more transactions being issued at the ETP flow level.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:

1. A device for providing an edge termination point (ETP) in a network, the device comprising:
   a memory; and
   a processor, the processor being configured to:
      receive an incoming internet protocol (IP) transaction;
      terminate the received incoming IP transaction at the ETP;
      map the terminated incoming IP transaction onto an ETP-to-ETP communication, wherein the ETP-to-ETP communication comprises a first ETP flow between a first ETP and a second ETP in the network, and a second ETP flow between the first ETP and a third ETP in the network, and wherein the first ETP flow comprises a first ETP transaction and the second ETP flow comprises a second ETP transaction;
      perform an ETP flow control for the first ETP flow and the second ETP flow by determining combined parameters for parameters associated with the first ETP flow and the second ETP flow when the incoming IP transaction is mapped onto the first ETP transaction and the second ETP transaction;
      control the ETP-to-ETP communication based on a resource management regime that comprises an ETP flow control; and
      map the ETP-to-ETP communication onto one or more outgoing IP transactions at the ETP.

2. The device of claim 1, wherein the processor is further configured to determine the combined parameters for parameters associated with two or more incoming IP transactions by determining at least one of a maximum round-trip time (RTT) timer or a credit value.

3. The device of claim 1, wherein the incoming and outgoing IP transactions comprise at least one of an IP packet transfer, a TCP session, a hyper transfer protocol (HTTP) session, a stream control transmission protocol (SCTP) session, a user datagram protocol (UDP) packet transfer, or an IP datagram packet transfer.

4. The device of claim 1, wherein the ETP-to-ETP communication is a Layer 2 communication.

5. The device of claim 1, wherein the ETP-to-ETP communication indicates a relationship between two or more ETPs that can be used for another transfer without further configuration.

6. The device of claim 1, wherein the ETP-to-ETP communication comprises one or more ETP transactions, and an ETP transaction comprises an error control information that comprises at least one of a sequence number, an outstanding packet, segment information, or reassembly information.

7. The device of claim 1, wherein the ETP flow control comprises one or more flow control parameters.

8. The device of claim 7, wherein the one or more flow control parameters comprise at least one of a credit, a timer for round trip dependent mechanism, or error rate information.

9. A method for providing an edge termination point (ETP) in a network, the method comprising:
  receiving an incoming internet protocol (IP) transaction;
  terminating the received incoming IP transaction at the ETP;
  mapping the terminated incoming IP transaction onto an ETP-to-ETP communication, wherein the ETP-to-ETP communication comprises a first ETP flow between a first ETP and a second ETP in the network, and a second ETP flow between the first ETP and a third ETP in the network, and wherein the first ETP flow comprises a first ETP transaction and the second ETP flow comprises a second ETP transaction;
  performing an ETP flow control for the first ETP flow and the second ETP flow by determining combined parameters for parameters associated with the first ETP flow and the second ETP flow when the incoming IP transaction is mapped onto the first ETP transaction and the second ETP transaction;
  controlling the ETP-to-ETP communication based on a resource management regime that comprises an ETP flow control; and
  mapping the ETP-to-ETP communication onto one or more outgoing IP transactions at the ETP.

10. The method of claim 9, wherein determining the combined parameters for parameters associated with two or more incoming IP transactions comprises determining at least one of a maximum round-trip time (RTT) timer or a low credit value.

11. The method of claim 9, wherein the incoming and outgoing IP transactions comprise at least one of an IP packet transfer, a TCP session, a hyper transfer protocol (HTTP) session, a stream control transmission protocol (SCTP) session, a user datagram protocol (UDP) packet transfer, or an IP datagram packet transfer.

12. The method of claim 9, wherein the ETP-to-ETP communication is a Layer 2 communication.

13. The method of claim 9, wherein the ETP-to-ETP communication constitutes a relationship between two or more ETPs that can be used for another transfer without further configuration.

14. The method of claim 9, wherein the ETP-to-ETP communication comprises one or more ETP transactions, and an ETP transaction comprises an error control information that comprises at least one of a sequence number, an outstanding packet, segment information, or reassembly information.

15. The method of claim 9, wherein the ETP flow control comprises one or more flow control parameters.

16. The method of claim 15, wherein the one or more flow control parameters comprises at least one of a credit, a timer for round trip dependent mechanism, or error rate information.

17. A non-transitory computer readable medium comprising computer-executable instructions to enable a processor to perform the method of claim 9.

18. A device for providing an edge termination point (ETP) in a network, the device comprising:
  a memory; and
  a processor, the processor being configured to:
    receive an incoming internet protocol (IP) transaction;
    terminate the received incoming IP transaction at the ETP;
    map the terminated incoming IP transaction onto an ETP-to-ETP communication, wherein the ETP-to-ETP communication comprises a first ETP flow between a first ETP and a second ETP in the network, and a second ETP flow between the first ETP and a third ETP in the network, and wherein the first ETP flow comprises a first EPT transaction and the second ETP flow comprises a second ETP transaction;
    perform an ETP flow control for the first ETP flow and the second ETP flow by determining combined parameters for parameters associated with the first ETP flow and the second ETP flow when the incoming IP transaction is mapped onto the first ETP transaction and the second ETP transaction;
    control the ETP-to-ETP communication based on a resource management regime that comprises an ETP flow control; and
    map the ETP-to-ETP communication onto one or more outgoing IP transactions at the ETP;
    wherein the incoming and outgoing IP transactions are one or more of a TCP session, a hyper transfer protocol (HTTP) session, or a stream control transmission protocol (SCTP) session.

* * * * *